US012566409B2

(12) United States Patent
Chen et al.

(10) Patent No.: US 12,566,409 B2
(45) Date of Patent: Mar. 3, 2026

(54) WEARABLE DEVICE AND MANUFACTURING METHOD THEREFOR

(71) Applicant: PEGATRON CORPORATION, Taipei City (TW)

(72) Inventors: Chien-I Chen, Taipei City (TW); Chia-Yin Yu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 425 days.

(21) Appl. No.: 18/122,587

(22) Filed: Mar. 16, 2023

(65) Prior Publication Data

US 2023/0400817 A1 Dec. 14, 2023

(30) Foreign Application Priority Data

Jun. 8, 2022 (TW) .................................. 111121149

(51) Int. Cl.
*G04G 17/08* (2006.01)
*G04G 17/04* (2006.01)

(52) U.S. Cl.
CPC ............. *G04G 17/08* (2013.01); *G04G 17/04* (2013.01)

(58) Field of Classification Search
CPC ...... G04G 17/08; G04G 17/04; G04G 17/045; G04B 43/00; G04B 37/02
See application file for complete search history.

(56) References Cited

U.S. PATENT DOCUMENTS

| | | | | |
|---|---|---|---|---|
| 2,656,674 | A * | 10/1953 | Bondy | G04B 37/02 368/291 |
| 3,811,401 | A * | 5/1974 | Piquerez | G04B 37/02 368/286 |
| 9,704,837 | B1 * | 7/2017 | Goh | H01L 23/585 |
| 10,310,567 | B2 * | 6/2019 | Kita | H04R 1/02 |
| 2015/0261267 | A1 | 9/2015 | Vadakkanmaruveedu et al. | |
| 2015/0313542 | A1 | 11/2015 | Goldberg et al. | |

FOREIGN PATENT DOCUMENTS

| | | | |
|---|---|---|---|
| CN | 1256797 | A | 6/2000 |
| CN | 107454766 | A | 12/2017 |
| TW | 202038027 | A | 10/2020 |

* cited by examiner

*Primary Examiner* — Edwin A. Leon
(74) *Attorney, Agent, or Firm* — Li & Cai Intellectual Property (USA) Office

(57) ABSTRACT

A wearable device includes a plastic housing, a ventilated metal member, and an electronic module. The plastic housing includes an accommodating portion, and the plastic housing includes a through hole. The plastic housing is combined with a periphery of the ventilated metal member through insert molding. The ventilated metal member seals the through hole. The ventilated metal member is waterproof and ventilated. The electronic module is arranged in the accommodating portion, and the electronic module, the ventilated metal member, and the plastic housing jointly form a closed space.

11 Claims, 8 Drawing Sheets

WEARABLE DEVICE AND MANUFACTURING METHOD THEREFOR

TECHNICAL FIELD

The present invention relates to a wearable device and a manufacturing method therefor, and in particular, to a wearable device available in a high-pressure environment and a low-pressure environment and a manufacturing method therefor.

BACKGROUND

Referring to FIG. 1, FIG. 1 is a schematic cross-sectional view of a conventional smart watch. For common smart watches, in order to balance the internal and external pressure of a smart watch and avoid damage to the internal structure or components caused by pressure differences, relevant manufacturers form a through hole A11 on an outer housing A1 of a body of the smart watch to balance the internal and external pressure, so as to stabilize the pressure difference between the inside and outside of the product accordingly.

However, in order to maintain the waterproof effect of the smart watch, the manufacturer of the smart watch attaches a waterproof and ventilated film A2 to an inner side of the housing A1. In addition, the relevant manufacturer further forms two screw holes A12 on the housing A1 and uses two screws A3 to fix a fixing frame A4 to the inner side of the housing A1, and uses the fixing frame A4 matching a foam component A5 to press against the waterproof and ventilated film A2. In this way, the bonding strength between the waterproof and ventilated film A2 and the housing A1 is strengthened.

The use of the waterproof and ventilated film A2, in combination with the screw hole A12, the screw A3, the fixing frame A4, and the foam component A5, results in higher manufacturing costs. Moreover, the space in the smart watch occupied by the screw hole A12, the screw A3, the fixing frame A4, and the foam component A5 will directly or indirectly make it difficult for manufacturers to add additional electronic components.

SUMMARY

The present invention provides a wearable device and a manufacturing method therefor, which is mainly intended to alleviate many problems that arise from use of a waterproof and ventilated film in combination with related auxiliary structure or components (such as the foregoing screw hole, the fixing frame, the screw, the foam component, and the like) in the conventional wearable device.

An embodiment of the present invention provides a wearable device, including a plastic housing, a ventilated metal member, and an electronic module. The plastic housing has an accommodating portion, and includes a through hole. Two ends of the through hole are respectively provided on the accommodating portion and in an external environment. The plastic housing is combined with a periphery of the ventilated metal member through insert molding. The ventilated metal member seals the through hole and is waterproof and ventilated. The electronic module is arranged in the accommodating portion, and the electronic module, the ventilated metal member, and the plastic housing jointly form a closed space.

An embodiment of the present invention provides a method for manufacturing a wearable device. The method includes: a housing manufacturing step: forming a plastic housing on a periphery of a ventilated metal member through insert molding, where the plastic housing includes an accommodating portion, and the ventilated metal member is waterproof and ventilated; and an assembling step: fixing an electronic module to the accommodating portion, so that the electronic module, the ventilated metal member and the plastic housing jointly form a closed space.

Based on the above, the wearable device and the manufacturing method therefor of the present invention can effectively reduce the overall manufacturing cost of the wearable device through the design of the ventilated metal member, and the like. Compared with the conventional manufacturing method of using the waterproof and ventilated film and the related auxiliary structures or components, the wearable device and the manufacturing method therefor of the present invention can allow the plastic housing to have a relatively larger space for use.

For further understanding of features and technical content of the present invention, refer to the following detailed description and accompanying drawings related to the present invention. However, the description and accompanying drawings are only intended to illustrate the present invention and not to limit the protection scope of the present invention.

DETAILED DESCRIPTION

In the following description, if "refer to a specific drawing" or "as shown in a specific drawing" is indicated, it is only used to emphasize that in a subsequent description, most of the related content mentioned is shown in the specific drawing, but does not limit only reference made to the specific drawing in the subsequent description.

Figure 1:
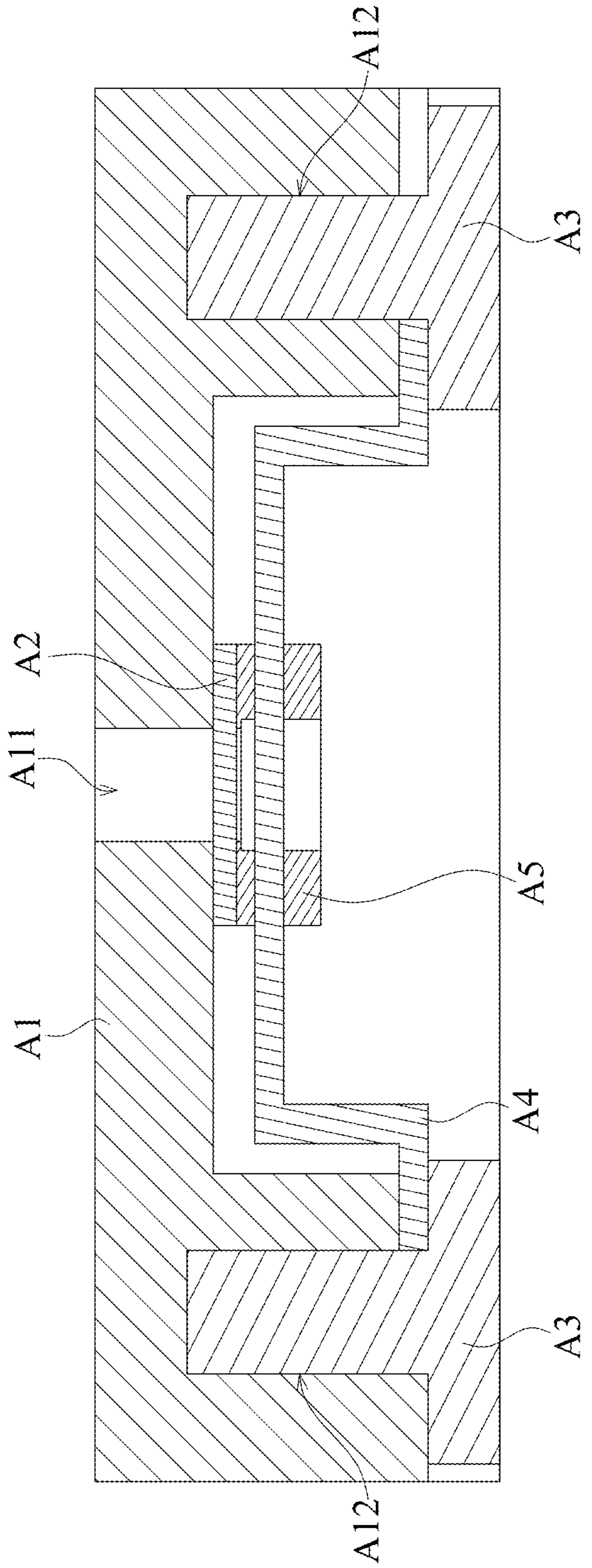
FIG. 1 Prior Art
FIG. 1 is a schematic cross-sectional view of a conventional smart watch.
Figure 2:
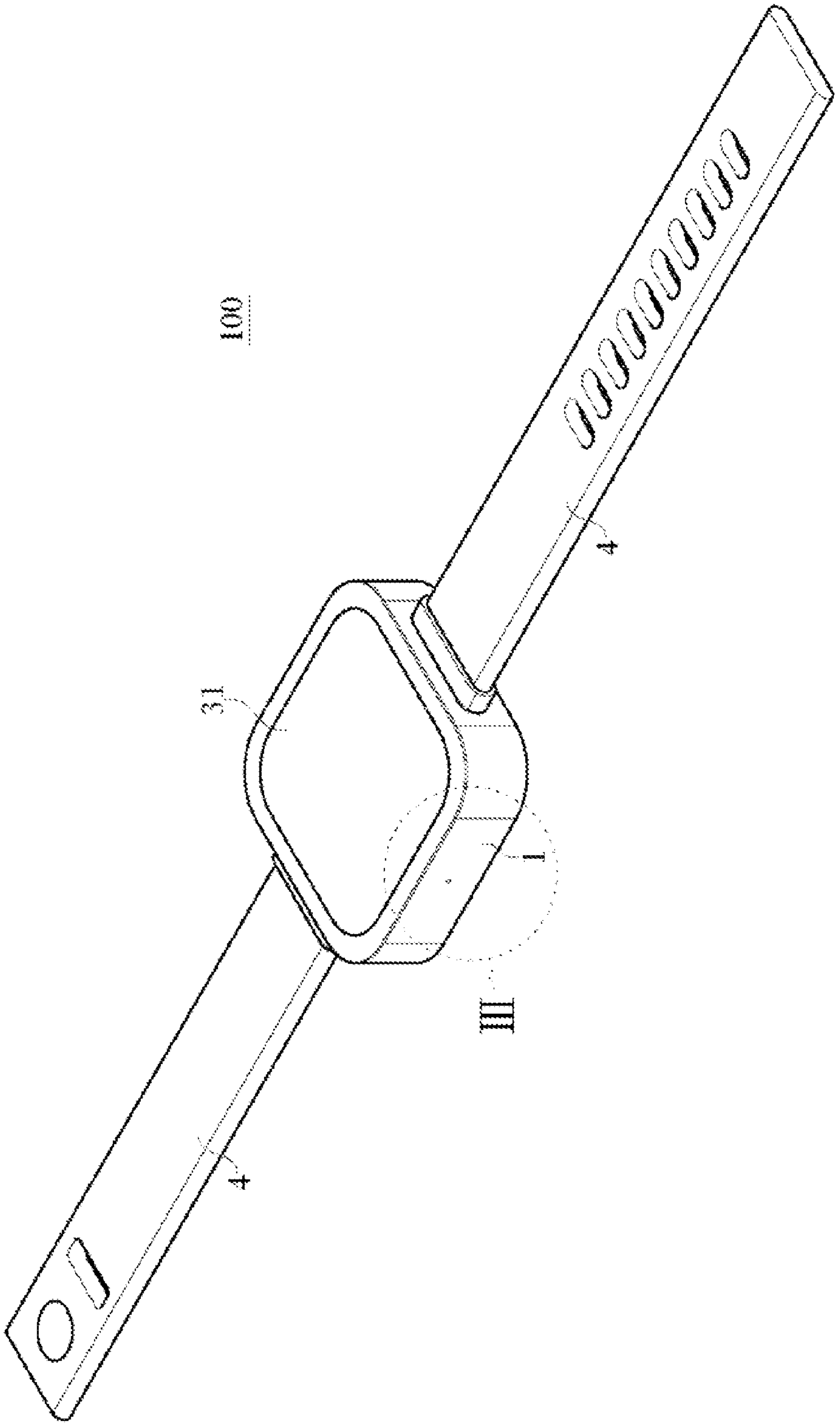
FIG. 2 is a schematic diagram of a wearable device according to the present invention.
Figure 3:
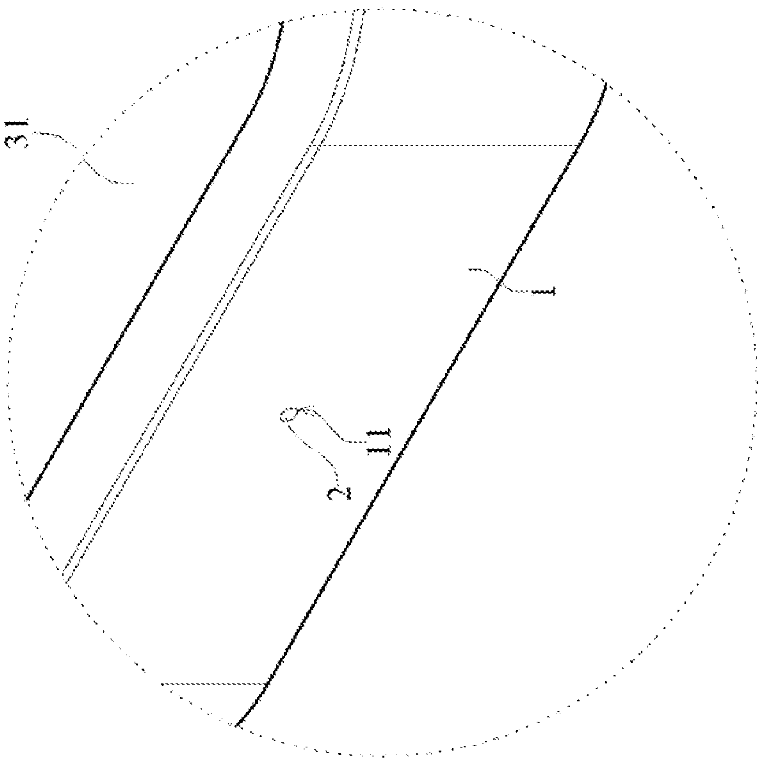
FIG. 3 is a partial schematic enlarged view of a wearable device according to the present invention.
Figure 4:
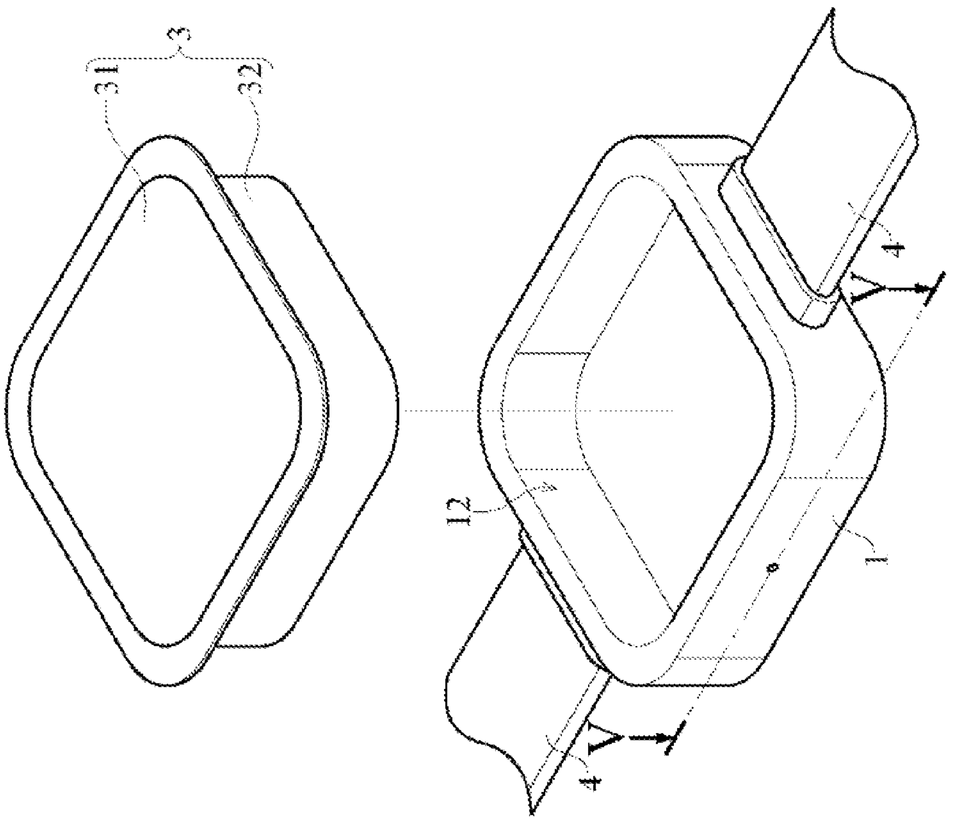
FIG. 4 is a schematic exploded view of a wearable device according to the present invention.
Figure 5:
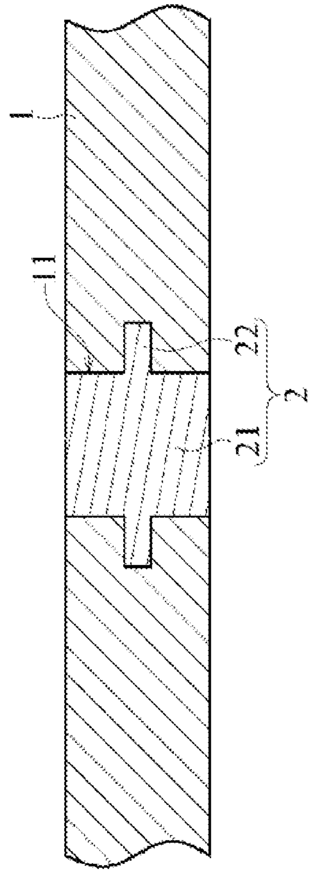
FIG. 5 is a schematic cross-sectional view of FIG. 4 taken along line V-V.

Refer to FIG. 2 to FIG. 5 together. FIG. 2 is a schematic diagram of a wearable device according to the present invention. FIG. 3 is a partial schematic enlarged view of a wearable device according to the present invention. FIG. 4 is a schematic exploded view of a wearable device according to the present invention. FIG. 5 is a schematic cross-sectional view of FIG. 4 taken along line V-V. A wearable device 100 of the present invention includes a plastic housing 1, a ventilated metal member 2, an electronic module 3, and two watchbands 4. The plastic housing 1 includes an accommodating portion 12, and the plastic housing 1 includes a through hole 11. Two ends of the through hole 11 are respectively provided on the accommodating portion 12 and in an external environment.

The plastic housing 1 is combined with a periphery of the ventilated metal member 2 through insert molding. The ventilated metal member 2 correspondingly seals the through hole 11, and the ventilated metal member 2 is ventilated and waterproof. A size and an appearance of the through hole 11 may be changed as required and are not limited to those shown in the drawings. In addition, an appearance and a size of the ventilated metal member 2 may also be changed as required, and those shown in the drawings are only example implementations.

In a specific embodiment, the ventilated metal member 2 may be, for example, made of steel, and the ventilated metal member 2 includes a plurality of material holes. An average diameter of the plurality of material holes is less than 20 microns (μm), and a porosity of the ventilated metal member 2 is about 25%. Certainly, the specific material of the ventilated metal member 2 and the average diameter of the material holes included therein are not limited by the above description. In practical application, as long as the ventilated metal member 2 can achieve the waterproof effect of stopping water molecules with a diameter greater than 100 microns and has the ventilated effect, a permeability range may be adjusted according to an actual condition, such as between 20% and 30%, and the material of the ventilated metal member 2 may be selected according to the requirement.

The electronic module 3 is arranged in the accommodating portion 12. The electronic module 3, the ventilated metal member 2, and the plastic housing 1 jointly form a closed space, and water molecules with a diameter greater than 100 microns outside the wearable device 100 cannot enter the closed space. In practical application, the electronic module 3 may include, for example, a display 31 and a control module 32. The display 31 may be, for example, a touch screen or a non-touch screen, which is not limited herein. The control module 32 may include various functions such as communication, air pressure measurement, temperature measurement, and so on according to the requirement, which is not limited herein. The control module 32 shown in the figure is only represented in a simple manner. An actual appearance of the control module 32 and the electronic components included therein are not limited by the above description or drawings.

Ends of the two watchbands 4 are fixed to the plastic housing 1, and the other ends of the two watchbands 4 may be operated to be fixed to each other. In the drawings of this embodiment, the wearable device 100 is applied as a smart watch by way of example. The wearable device 100 includes two watchbands 4, but the wearable device 100 of the present invention is not limited to application only as the smart watch. For example, the wearable device 100 of the present invention may also be applied as a mountain climbing navigation device, a bicycle stopwatch, and the like.

Figure 6:
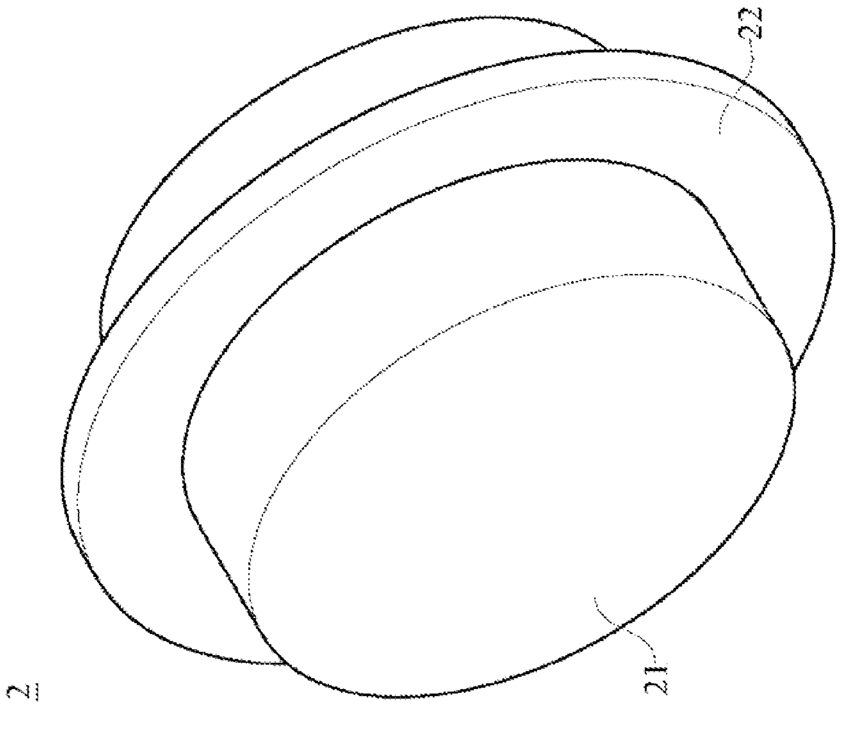
FIG. 6 is a schematic diagram of an embodiment of a ventilated metal member of a wearable device according to the present invention.

Refer to FIG. 5 and FIG. 6 together. FIG. 6 is a schematic diagram of an embodiment of ab ventilated metal member of a wearable device according to the present invention. In practical application, the ventilated metal member 2 may include a body 21 and a protruding structure 22. The body 21 may be a structure close to a circular sheet or a structure close to a cylinder. A periphery of the body 21 may protrude to form an annular protruding structure 22, and a thickness of the body 21 is not equal to a thickness of the protruding structure 22. This design can lead to a more desirable bonding strength between the plastic housing 1 combined with the ventilated metal member 2 through insert molding and the ventilated metal member 2. Certainly, the shape of the body 21 of the ventilated metal member 2 may be changed according to the shape of the through hole 11 of the housing 1. For example, if the through hole 11 is in a square shape, the body 21 of the ventilated metal member 2 may be a structure close to a square sheet or a structure close to a square column. In addition, a quantity of protruding structures 22 and the shapes are not limited to those shown in the drawings. In different embodiments, the periphery of the body 21 may also extend outward to form a plurality of protruding structures 22. The plurality of protruding structures 22 may be arranged at intervals, and the shape of each of the protruding structures 22 may be a polygonal sheet structure, a polygonal columnar structure, or the like.

Figure 7:
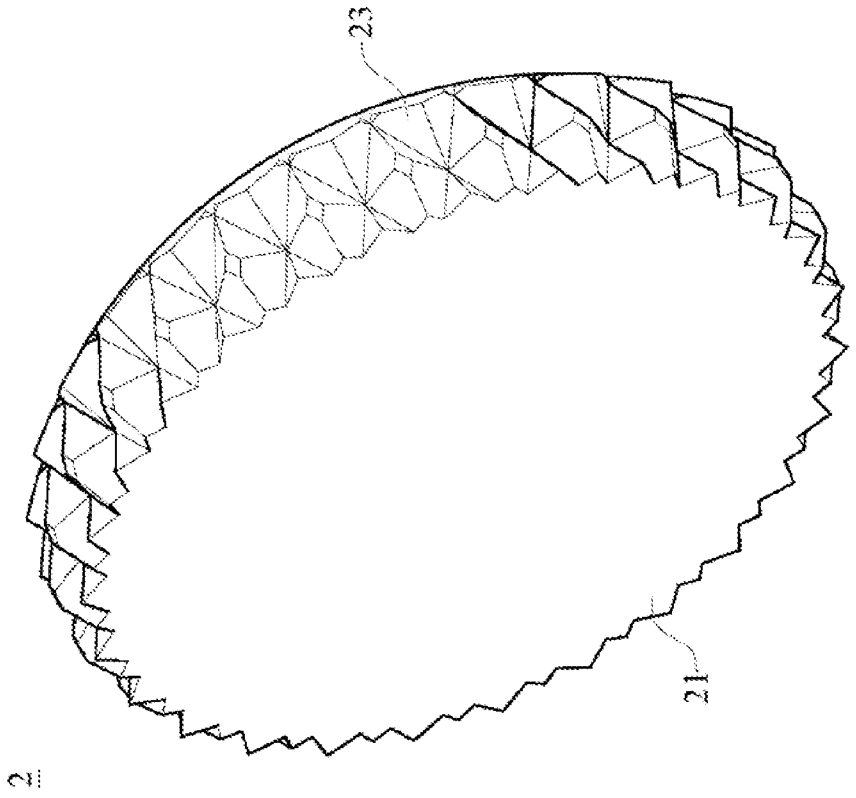
FIG. 7 is a schematic diagram of an embodiment of a ventilated metal member of a wearable device according to the present invention.

Referring to FIG. 7, FIG. 7 is a schematic diagram of an embodiment of a ventilated metal member of a wearable device according to the present invention. In order to strengthen the bonding strength between the ventilated metal member 2 and the plastic housing 1, a textured structure 23 may be formed on the periphery of the ventilated metal member 2. In this embodiment, the textured structure 23 is basically formed by a plurality of structures in a shape similar to a pyramid, but the textured structure 23 is not limited to that shown in the figure.

Figure 8:
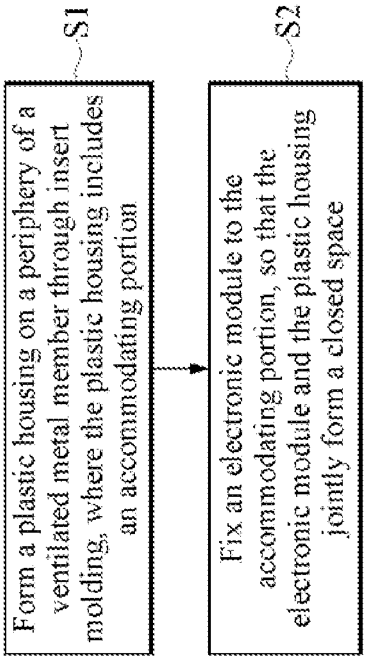
FIG. 8 is a schematic flowchart of a method for manufacturing a wearable device according to the present invention.

Referring to FIG. 8, FIG. 8 is a schematic flowchart of a method for manufacturing a wearable device according to the present invention. The method for manufacturing a wearable device of the present invention includes the following steps:

- a housing manufacturing step S1: forming a plastic housing on a periphery of a ventilated metal member through insert molding, where the plastic housing includes an accommodating portion, and the ventilated metal member is waterproof and ventilated; and
- an assembling step S2: fixing an electronic module to the accommodating portion, so that the electronic module and the plastic housing jointly form a closed space.

For detailed descriptions of the ventilated metal member, the plastic housing and the accommodating portion thereof, and the electronic module, reference is made to the description of the above embodiments, and the details are not described herein again.

It should be noted that, according to different wearable devices to be actually manufactured, a corresponding assembling step may be added to the assembling step S2. For example, if the method for manufacturing a wearable device of the present invention is applied to manufacture the smart watch, the assembling step S2 further includes a step of causing ends of the two watchbands to be respectively fixed to the plastic housing.

Based on the above, according to the wearable device and the manufacturing method therefor of the present invention, the conventional ventilated waterproof film and the related auxiliary structures or components are replaced by combining the plastic housing with the periphery of the ventilated metal member through insert molding, so as to effectively reduce the manufacturing cost and effectively increase the usable space within the plastic housing.

Since the above descriptions are merely preferred feasible embodiments of the present invention and does not hereby limit the claims of the present invention, all equivalent technical changes made by using the specification and the drawings of the present invention are included in the protection scope of the present invention.

What is claimed is:

1. A wearable device, comprising:

a plastic housing, comprising an accommodating portion and a through hole, wherein two ends of the through hole are respectively provided on the accommodating portion and in an external environment;

a ventilated metal member, configured to seal the through hole, wherein the ventilated metal member is waterproof and ventilated, and the plastic housing is combined with a periphery of the ventilated metal member through insert molding; and an electronic module, arranged in the accommodating portion, wherein the electronic module, the ventilated metal member, and the plastic housing jointly form a closed space.

2. The wearable device according to claim 1, wherein a textured structure is formed on the periphery of the ventilated metal member.

3. The wearable device according to claim 1, wherein at least one protruding structure is arranged on the periphery of the ventilated metal member, and the protruding structure is configured to be engaged with the plastic housing.

4. The wearable device according to claim 1, wherein the ventilated metal member comprises a plurality of material holes, and an average diameter of the plurality of material holes is less than 20 microns.

5. The wearable device according to claim 4, wherein a porosity of the ventilated metal member is between 20% and 30%.

6. The wearable device according to claim 1, wherein the ventilated metal member is made of steel.

7. The wearable device according to claim 1, further comprising two watchbands, wherein one end of each of the watchbands is fixed to the plastic housing, and the electronic module comprises a display.

8. A method for manufacturing a wearable device, comprising:

a housing manufacturing step: forming a plastic housing on a periphery of a ventilated metal member through insert molding, wherein the plastic housing comprises an accommodating portion, and the ventilated metal member is waterproof and ventilated; and an assembling step: fixing an electronic module to the accommodating portion, so that the electronic module, the ventilated metal member, and the plastic housing jointly form a closed space.

9. The method for manufacturing a wearable device according to claim 8, wherein the ventilated metal member comprises a plurality of material holes, and an average diameter of the plurality of material holes is less than 20 microns.

10. The method for manufacturing a wearable device according to claim 9, wherein a porosity of the ventilated metal member is between 20% and 30%.

11. The method for manufacturing a wearable device according to claim 8, wherein the ventilated metal member is made of steel.

* * * * *